(12) United States Patent
Vajipayajula et al.

(10) Patent No.: US 11,171,982 B2
(45) Date of Patent: Nov. 9, 2021

(54) OPTIMIZING INGESTION OF STRUCTURED SECURITY INFORMATION INTO GRAPH DATABASES FOR SECURITY ANALYTICS

(71) Applicant: International Business Machines Corporation, Armonk, NY (US)

(72) Inventors: Sulakshan Vajipayajula, Bangalore (IN); Stephen C. Will, Raleigh, NC (US); Dhilung Hang Kirat, White Plains, NY (US); Kaushal K. Kapadia, Ashok Nagar (IN); Anne Tilstra, Smyrna, GA (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 16/016,198

(22) Filed: Jun. 22, 2018

(65) Prior Publication Data

US 2019/0394225 A1    Dec. 26, 2019

(51) Int. Cl.
*H04L 29/06* (2006.01)
*G06F 16/21* (2019.01)
*G06F 16/901* (2019.01)

(52) U.S. Cl.
CPC ........ *H04L 63/1441* (2013.01); *G06F 16/212* (2019.01); *G06F 16/9024* (2019.01); *H04L 63/1416* (2013.01)

(58) Field of Classification Search
CPC ............. H04L 63/1441; H04L 63/1416; G06F 16/212; G06F 16/9024; G06F 17/30477
See application file for complete search history.

(56) References Cited

U.S. PATENT DOCUMENTS

| | | | |
|---|---|---|---|
| 10,586,046 B1* | 3/2020 | Herman-Saffar | G06F 21/554 |
| 2010/0083003 A1* | 4/2010 | Spackman | H04L 9/0643 |
| | | | 713/193 |
| 2015/0347480 A1 | 12/2015 | Smart | |
| 2016/0255050 A1 | 9/2016 | Grayson et al. | |
| 2017/0063912 A1* | 3/2017 | Muddu | H04L 63/1425 |
| 2018/0027006 A1 | 1/2018 | Zimmermann et al. | |
| 2019/0392074 A1* | 12/2019 | Little | G06F 16/258 |
| 2021/0133202 A1* | 5/2021 | Fry | G06F 16/212 |

OTHER PUBLICATIONS

Mell et al., "The NIST Definition of Cloud Computing," National Institute of Standards and Technology Special Publication 800-145, Sep. 2011, 7 pages.

* cited by examiner

*Primary Examiner* — Brian F Shaw
(74) *Attorney, Agent, or Firm* — Yee & Associates, P.C.

(57) ABSTRACT

Optimizing ingestion of security structured data into a graph database for security analytics is provided. A plurality of streams of information is received from a plurality of security information sources. Respective subsets of information are ingested from each of the plurality of security information sources to generate small subgraphs of security information. Each of the small subgraphs comply to a schema used by a master knowledge graph. A batch process is performed to ingest a plurality of small subgraphs into the master knowledge graph.

25 Claims, 9 Drawing Sheets

OPTIMIZING INGESTION OF STRUCTURED SECURITY INFORMATION INTO GRAPH DATABASES FOR SECURITY ANALYTICS

BACKGROUND

1. Field

The disclosure relates generally to graph databases and more specifically to optimizing ingestion of structured security information into a cloud-based master knowledge graph database for data security analytics.

2. Description of the Related Art

A graph database is a database that uses graph structures for semantic queries with nodes, edges, and properties to represent and store data. Nodes in the graph database represent entities, such as, for example, people, businesses, accounts, or any other item you might want to keep track of. Properties are pertinent information that relate to nodes. Edges represent the relationships that connect nodes to nodes or nodes to properties. The edges may be directed from one node to another or undirected with no specific from-to relationship between a pair of nodes.

Data security means protecting digital data, such as data in a graph database, from malicious and unwanted actions, such as cyberattack or data breach. Structured data refers to data that are of a determined length or structure and that reside in a fixed field or record. Credit card numbers, social security numbers, and telephone numbers are but a few examples of structured data. Defined parameters of structured data make structured data some of the easiest data to organize and analyze. Businesses and organizations rely on the ability to quickly access the information in structured data, Structured data also can be incredibly valuable, and as such, a prime target for cyberattack or data breach. Aside from increasingly prevalent data security threats, businesses and organizations also face pressure to comply with industry regulations and government mandates that govern this type of data, making protection of structured data a must.

SUMMARY

According to one illustrative embodiment, a computer-implemented method for optimizing ingestion of security structured data into a graph database for security analytics is provided. A plurality of streams of information is received from a plurality of security information sources. Respective subsets of information are ingested from each of the plurality of security information sources to generate small subgraphs of security information. Each of the small subgraphs comply to a schema used by a master knowledge graph. A batch process is performed to ingest a plurality of small subgraphs into the master knowledge graph. According to other illustrative embodiments, a data processing system and computer program product for optimizing ingestion of security structured data into a graph database for security analytics are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-6, diagrams of data processing environments are provided in which illustrative embodiments may be implemented. It should be appreciated that FIGS. 1-6 are only meant as examples and are not intended to assert or imply any limitation with regard to the environments in which different embodiments may be implemented. Many modifications to the depicted environments may be made.

Figure 1:
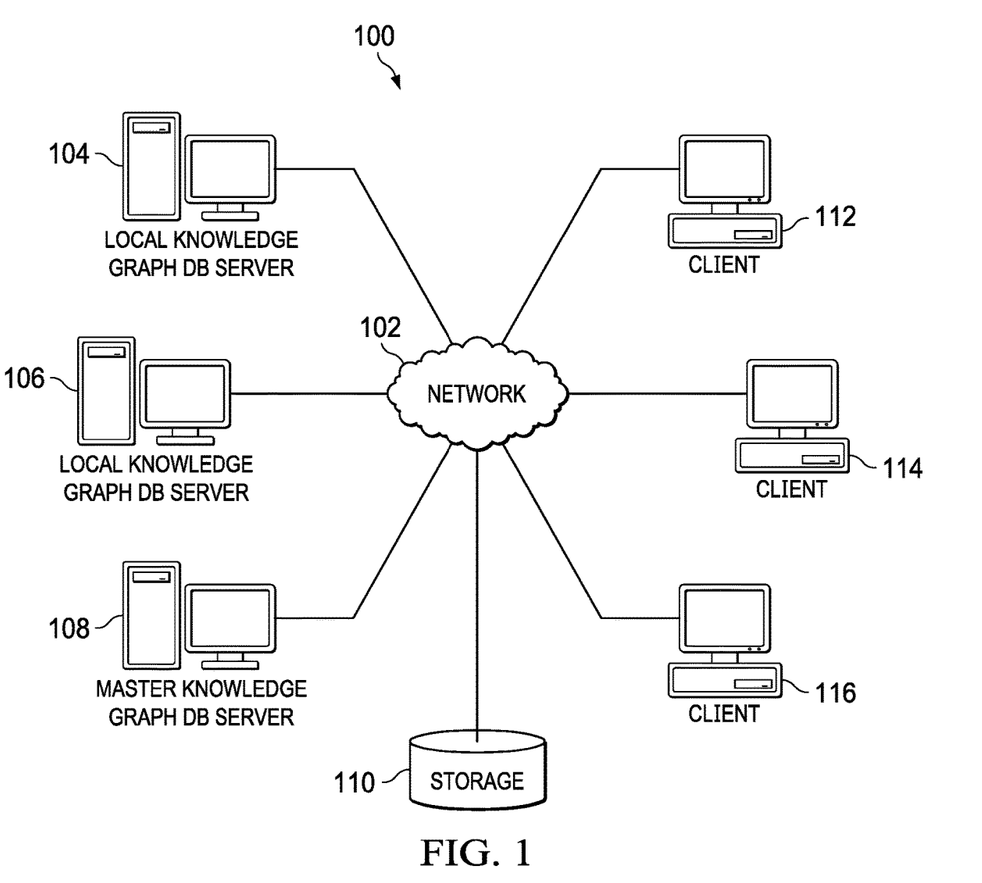
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104, server 106, and server 108 connect to network 102, along with storage 110. Server 104, server 106, and server 108 may be, for example, server computers with high-speed connections to network 102. In addition, it should be noted that server 104, server 106, and server 108 may each represent multiple computing nodes in a cloud environment. Alternatively, server 104, server 106, and server 108 may each represent a cluster of servers in one or more data security service centers.

Also in the depicted example, server 104 and server 106 are local knowledge graph database servers and server 108 is a master knowledge graph database server. Local knowledge graph database servers 104 and 106 each ingest a different type of data security information from a different data security information source, generate local data security risk knowledge subgraphs using the ingested data security information, and bulk upload the local data security risk knowledge subgraphs to master knowledge graph database server 108. Master knowledge graph database server 108 hosts a master data security risk knowledge graph that contains information corresponding to the uploaded local data security risk knowledge subgraphs. In addition, master knowledge graph database server 108 provides data security analytics services by traversing the master data security risk knowledge graph, determining malicious associations in the master data security risk knowledge graph during security incident analysis, and performing one or more action steps to mitigate determined malicious activity, events, or incidents.

Client 112, client 114, and client 116 also connect to network 102. Clients 112, 114, and 116 are clients of master knowledge graph database server 108. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart watches, smart televisions, and the like. Users of clients 112, 114, and 116 may utilize clients 112, 114, and 116 to access the data security analytics services provided by master knowledge graph database server 108.

Storage 110 is a network storage device capable of storing any type of data in a structured format. In addition, storage 110 may represent a plurality of network storage devices. Further, storage 110 may store identifiers and network addresses for a plurality of security information sources, identifiers and network addresses for a plurality of local knowledge graph databases, a plurality of different security information, identified data security risk events, and the like. Furthermore, storage unit 110 may store other types of data, such as authentication or credential data that may include user names, passwords, and biometric data associated with data security analysts, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on master knowledge graph database server 108 and downloaded to local knowledge graph database server 106 and client 112 over network 102 for use on local knowledge graph database server 106 and client 112.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
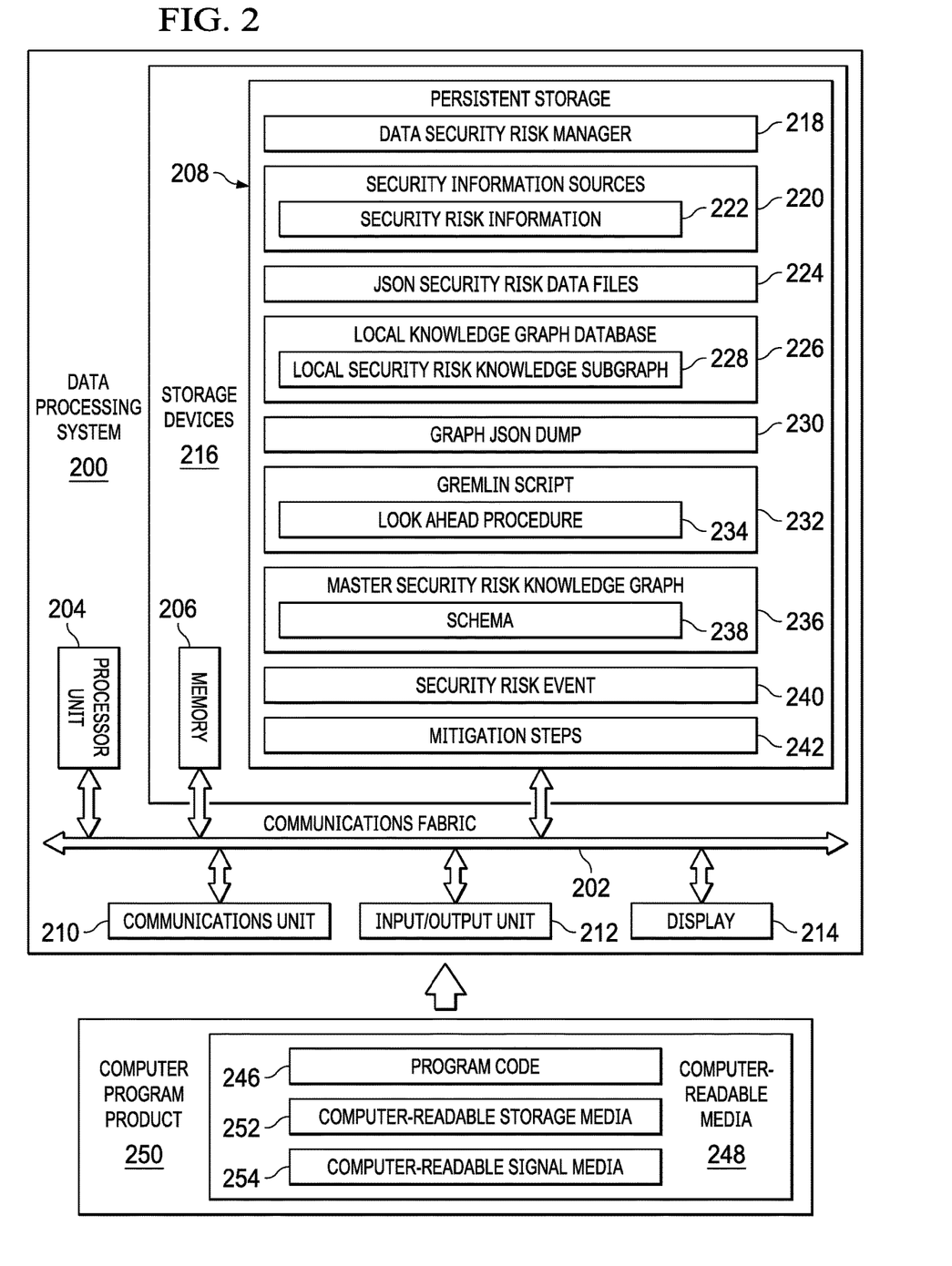
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as local knowledge graph database server 104 and master knowledge graph database server 108 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores data security risk manager 218. However, it should be noted that even though data security risk manager 218 is illustrated as residing in persistent storage 208, in an alternative illustrative embodiment data security risk manager 218 may be a separate component of data processing system 200. For example, data security risk manager 218 may be a hardware component coupled to communication fabric 202 or a combination of hardware and software components. In another alternative illustrative embodiment, a first portion of data security risk manager 218 may be located in data processing system 200 and a second portion of data security risk manager 218 may be located in a second data processing system, such as, for example, local knowledge graph database server 104 in FIG. 1.

Data security risk manager 218 controls the process of optimizing ingestion of structured security information from a plurality of local knowledge graph database servers into master security risk knowledge graph 236 for data security analytics. Security information sources 220 represent a listing of a plurality of different security information sources, such as, for example, X-Force Exchange, malware campaign collections, and other types of data risk and security intelligence sharing services. Security information sources 220 provide security risk information 222. Security risk information 222 is information regarding a data threat associated with an entity or network connection. Security risk information 222 may include, for example, Internet Protocol (IP) address reputation, malware hashes, Uniform Resource Locator (URL) reputation, common vulnerability information and scores, Domain Name System (DNS) records, and the like.

JavaScript Object Notation (JSON) security risk data files 224 represent data files that contain security risk information 222 in JSON. JavaScript Object Notation is an open-standard file format that uses human-readable text to transmit data objects. Each different JSON security risk data file in JSON security risk data files 224 contains data regarding a different type of security risk information.

Local knowledge graph database 226 represents a listing of a set of one or more local knowledge graph databases, such as local knowledge graph database servers 104 and 106 in FIG. 1. Local knowledge graph database 226 contains local security risk knowledge subgraph 228. Local knowledge graph database 226 generates local security risk knowledge subgraph 228 from a corresponding JSON security risk data file in JSON security risk data files 224 that contains a particular set of security risk information.

Local knowledge graph database 226 generates graph JSON dump 230 from local security risk knowledge subgraph 228. Graph JSON dump 230 converts the particular security risk information contained in local security risk knowledge subgraph 228 into a data string. Local knowledge graph database 226 generates Gremlin script 232 from graph JSON dump 230. Gremlin script 232 is a custom graph programming language for inserting new nodes and edges, which correspond to the particular set of security risk information contained in local security risk knowledge subgraph 228, into master security risk knowledge graph 236.

One example of Gremlin script 232 for inserting new nodes and edges into master security risk knowledge graph 236 is as follows:

```
{"gremlin":"import org.apache.tinkerpop.gremlin.structure.Vertex; def 1 = []; def g = graph.traversal( );\
    vertices.each { \
        List properties = ((List)it); \
            String label = (String)properties[0]; \
            String keyid = (String)properties[1]; \
            String value = (String)properties[2]; \
            properties.remove(0); properties.remove(0);properties.remove(0);
\
        Vertex v;\
        def v1 = g.V( ).has(\\\"keyid\\\",keyid);\
        if( v1.hasNext( )){ v = v1.next( ) ; } \
        else{ v =
graph.addVertex(T.label,label,\\\"keyid\\\",keyid,\\\"value\\\",value);}; \
            1.push(v.id( ));\
            for (def i = 0;i<properties.size( ); i += 2) {\
            v.property((String) properties[i],\
                    properties[i + 1]);}\
        }; 1;","
bindings:{ <>
}
'{"gremlin":"import org.apache.tinkerpop.gremlin.structure.Vertex;import
org.apache.tinkerpop.gremlin.structure.Edge; def 1 = []; def g = graph.traversal( );\
    edges.each { \
        List properties = ((List)it); \
            String label = (String)properties[0]; \
            String keyid0 = (String)properties[1]; \
            String keyid1 = (String)properties[2]; \
            properties.remove(0); properties.remove(0);properties.remove(0);
\
        Vertex va ;Vertex vb;Edge e;\
        def v0 = g.V( ).has(\\\"keyid\\\",keyid0);\
        def v1 = g.V( ).has(\\\"keyid\\\",keyid1);\
        if( v0.hasNext( ) && v1.hasNext( )){ va = v0.next( ); vb = v1.next( ); \
            if( label != \\\"REPUTATION\\\" &&
g.V(va.id( )).out(label).hasId(vb.id( )).hasNext( )){\
                1<<0;\
            }\
            else{\
                e = va.addEdge(label,vb);\
                1 << e.id( );\
                for (def i = 0;i<properties.size( ); i += 2) {\
                    e.property((String) properties[i],\
                        properties[i + 1]);\
                }\
            }\
        }\
    }; 1;","
bindings{ }.
```

Gremlin script 232 also includes look ahead procedure 234. Prior to Gremlin script 232 inserting nodes and edges into master security risk knowledge graph 236, look ahead procedure 234 checks to make sure that none of the nodes and edges to be inserted into master security risk knowledge graph 236 already exist in master security risk knowledge graph 236. In other words, Gremlin script 232 will not insert duplicate nodes and edges into master security risk knowledge graph 236 to prevent overload of memory 206.

Master security risk knowledge graph 236 contains information ingested from a plurality of local security risk knowledge subgraphs. Master security risk knowledge graph 236 stores the ingested security risk information according to schema 238. Also, it should be noted that each local security risk knowledge subgraph also complies with schema 238.

Data security risk manager 218 traverses master security risk knowledge graph 236 to identify security risk event 240. Security risk event 240 represents a malicious activity or incident associated with a node or edge in master security risk knowledge graph 236. Upon detection of security risk event 240, data security risk manager 218 performs mitigation steps 242. Mitigation steps 242 represent a set of one or more action steps to reduce or eliminate the data threat. One action step may be to send a notification to a security analyst to take appropriate action regarding security risk event 240. Another action step may be for data security risk manager 218 to automatically close a network connection corresponding to security risk event 240.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 246 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
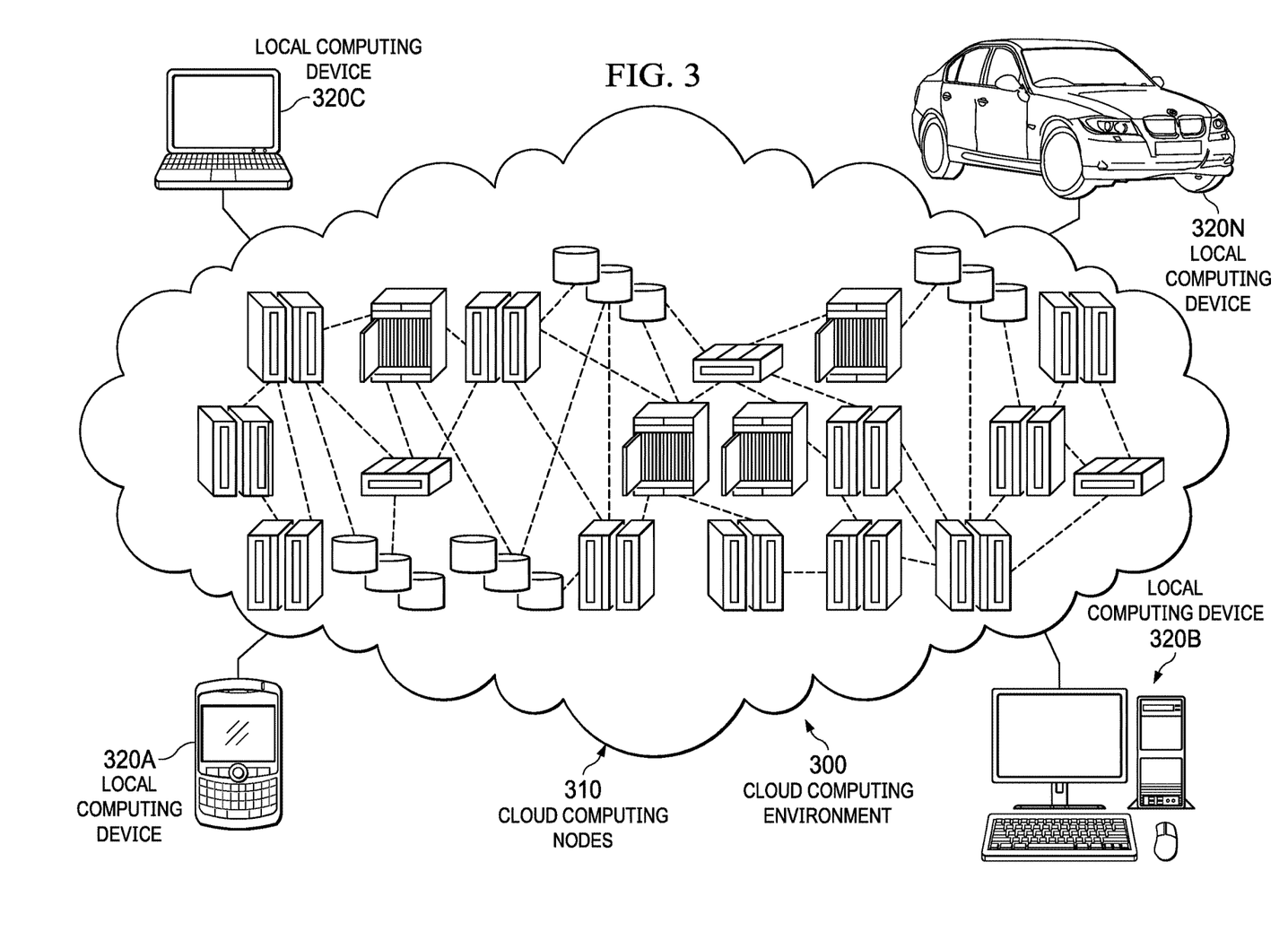
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, image provider server 104 and hypervisor server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
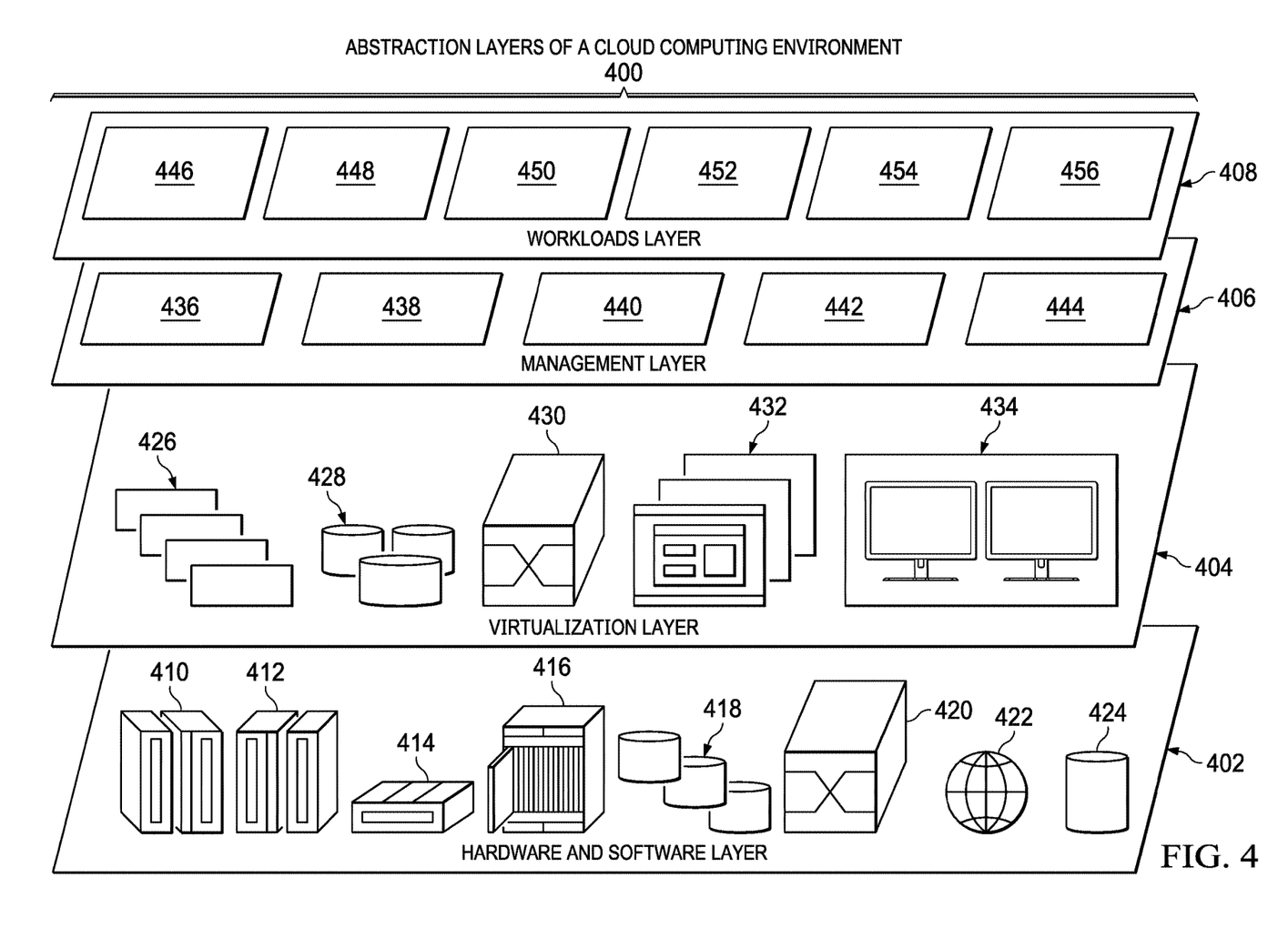
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and data security analytics processing 456.

In the world of continuously mutating security risks, the job of a security analyst investigating a security-related incident has become very complex. Use of graph databases can help in identifying malicious relationships when analyzing security incidents. Many cloud-based managed graph database offerings currently exist that illustrative embodiments can leverage to speed the implementation process and focus on analytics versus database administration. However, the real challenge is to put several gigabytes of structured data into a cloud-based graph database. Traversals are prohibitively due to the time involved in processing a huge volume of data to be ingested into a cloud-based graph database.

Illustrative embodiments are capable of processing terabytes of structured security data, for example, and ingesting them into a cloud-based SaaS graph database. Illustrative embodiments utilize a specific graph schema to link security information from security risk portals, which may include IP address reputation, malware hashes, URL reputation, vulnerability information and scores, DNS records, and the like. Illustrative embodiments source the security information from multiple locations, such as X-Force Exchange, malware campaign collections, and other similar types of services that provide risk and security intelligence sharing. The cloud-based SaaS graph database of illustrative embodiments serves as a platform for intelligent traversals to determine malicious association of observables during security incident analysis.

Illustrative embodiments ingest small subsets of security information into a plurality of local knowledge graph instances ensuring schema compliance with a remote cloud-based master knowledge graph instance. Illustrative embodiments generate a corresponding graph JSON dump from each of the plurality of local knowledge graph instances. Illustrative embodiments later batch process the plurality of graph JSON dumps for ingestion into the cloud-based master knowledge graph. One reason for this process is that local ingestion of security information subsets into local knowledge graph instances has a smaller footprint. As a result, illustrative embodiments are capable of processing very large datasets (e.g., terabytes of data) faster this way.

Illustrative embodiments utilize bindings to insert several security information records (i.e., nodes and edges) at a same time using generated Gremlin script corresponding to the security information records, while invoking a Representational State Transfer (REST) Application Programming Interface (API) of the master knowledge graph database to avoid compilation overhead. In addition, illustrative embodiments execute a look ahead procedure of the Gremlin script to avoid memory overflow in the master knowledge graph database prior to inserting a new node or edge into the master knowledge graph as part of a bulk upload. The look ahead procedure checks for duplicate nodes and edges. In other words, the look ahead procedure checks to make sure that one or more of the new nodes and edges to be inserted into the master knowledge graph are not the same as already existing nodes and edges in the master knowledge graph. As a result, the Gremlin script will not insert duplicate nodes and edges into the master knowledge graph.

Further, illustrative embodiments utilize native cloud Kubernetes pods for distributed ingestion of graph data that automatically scales with the size of data to be processed. Each Kubernetes pod processes a different type of security information to be inserted into the master knowledge graph. Illustrative embodiments achieve higher throughput because of parallel ingestion using the generated ingestion Gremlin scripts.

Illustrative embodiments split JSON data, which corresponds to a particular type of security information, into smaller chunks for ingestion into a local knowledge graph database decreasing the footprint and time needed to ingest the smaller chunks of security information. Illustrative embodiments generate graph JSON dumps from ingested security information in each of the local knowledge graph databases. Complete graph JSON dumps are made possible through the smaller subgraphs of security information in each of the local knowledge graph databases. Illustrative embodiments then generate special purpose Gremlin script from each graph JSON dump for ingesting new nodes and edges into the remote cloud-based master knowledge graph database. The generated custom Gremlin script is directly used by multiple Kubernetes pods, which call the REST API of the cloud-based master knowledge graph to overcome data size and throughput limitations.

Illustrative embodiments automatically connect the heterogenous security information datasets (IP address reputation, URL reputation, malware hashes, vulnerability scores, DNS records, and the like) during ingestion into the master knowledge graph. Illustrative embodiments perform security analytics using the master knowledge graph to determine a security risk event or incident. Illustrative embodiments traverse the master knowledge graph starting from an observable finding the malicious node or nodes and edges directly or indirectly (e.g., multiple hops) connected. For example, starting from a URL node, the traversal finds domain names attached to the URL and the DNS resolution (i.e., IP address) for that domain. Then, if the IP address has a malicious reputation (e.g., command and control (CnC) server), illustrative embodiments return the malicious nodes and edges as a sub-graph. At the end of the security analysis, illustrative embodiments may display to a security analyst all malicious relationships and possible malware campaigns associated with the relationships. The security analyst can respond to the security incident accordingly. Alternatively, illustrative embodiments may take affirmative action, such as, for example, modifying or terminating network connections to eliminate the security risk posed by the identified malicious nodes and edges in the master knowledge graph.

Thus, illustrative embodiments take into consideration and address the problem of curating (i.e., organizing and integrating) a large set data collected from a variety of different security information sources into a cloud-based master knowledge graph database following normalization of the security information and uniquely marking the security information (e.g., with a unique key) so that entities associated with the security information are identified similarly in both the local and remote knowledge graph databases. Consequently, illustrative embodiments are capable of ingesting large amounts of security information at high rates of speed into the cloud-based master knowledge graph database. As a result, illustrative embodiments are directed toward a technical solution to a technical problem of handling ingestion of security information from a variety of security information sources and organizing that security information in such a way as to achieve high speed ingestion into the cloud-based master knowledge graph database.

Figure 5:
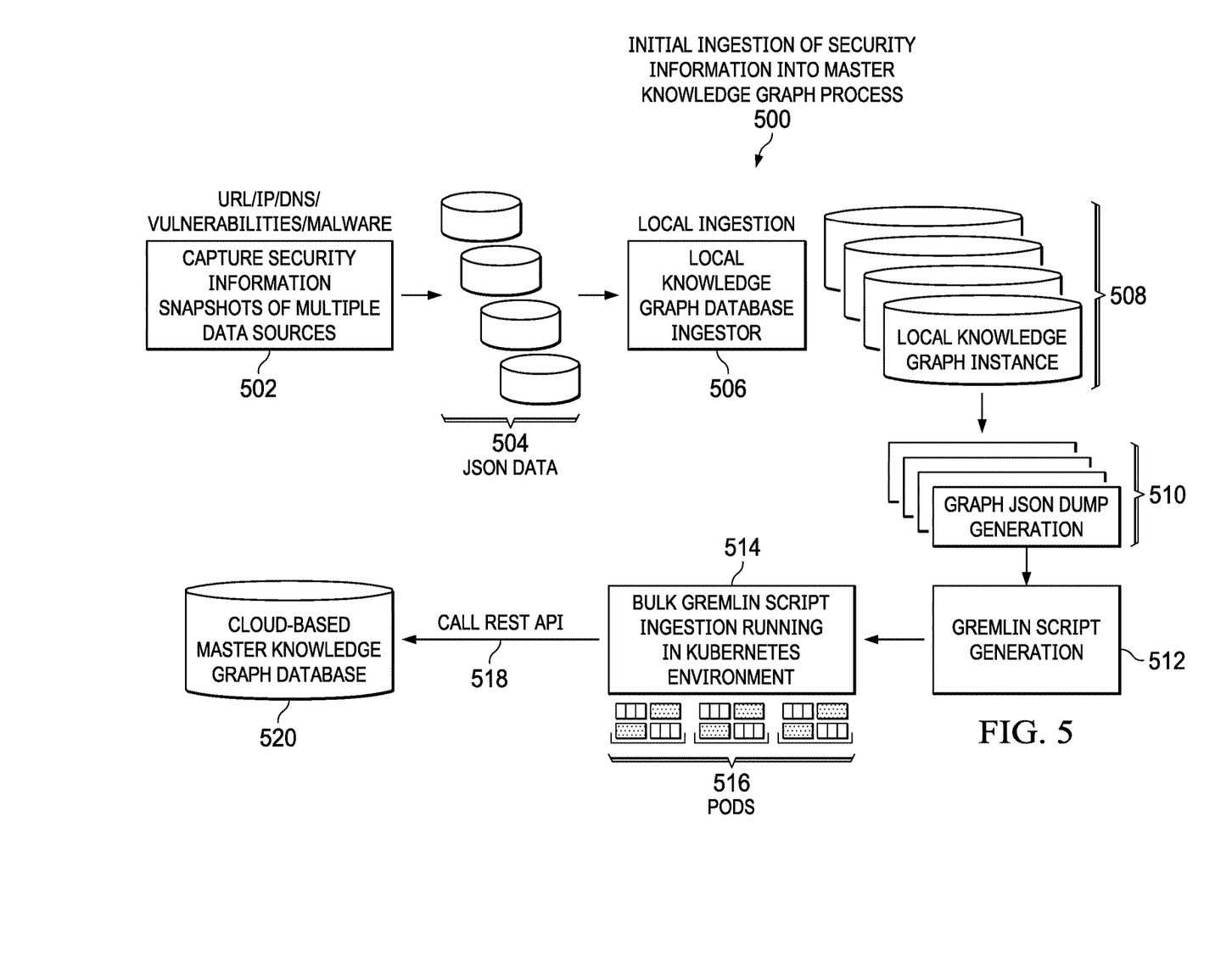
FIG. 5 is a diagram illustrating initial ingestion of security information into a cloud-based master knowledge graph in accordance with an illustrative embodiment.

With reference now to FIG. 5, a diagram illustrating initial ingestion of security information into a cloud-based master knowledge graph is depicted in accordance with an illustrative embodiment. Initial ingestion of security information into master knowledge graph process 500 may be implemented in a network of data processing systems, such as network data processing system 100 in FIG. 1, or a cloud computing environment, such as cloud computing environment 300 in FIG. 3. Initial ingestion of security information into master knowledge graph process 500 optimizes ingestion of structured security information into a cloud-based master knowledge graph database for enhanced performance of data security analytics.

At 502, process 500 captures security information snapshots of multiple security information sources. The security information may be, for example, IP address reputation, URL reputation, malware hashes, DNS records, and the like. At 504, process 500 generates a separate JSON security risk data file for each different security information type.

At 506, process 500 ingests each separate JSON security risk data file into a different local knowledge graph database. At 508, process 500 generates a local security risk knowledge subgraph instance in each different local knowledge graph database using the JSON security risk data file corresponding to that particular local knowledge graph database. At 510, process 500 generates a graph JSON dump for each local security risk knowledge subgraph instance in each different local knowledge graph database.

At 512, process 500 generates a specifically-tailored Gremlin script for each different security information type based on each generated graph JSON dump. At 514, process 500 bulk ingests the specifically-tailored Gremlin scripts into pods 516 of a Kubernetes container-orchestration environment and executes the specifically-tailored Gremlin scripts at a same time in parallel. Each pod in pods 516 contain one or more containers. In addition, each pod in pods 516 processes a different type of security information using the specifically-tailed Gremlin script ingested into that particular pod.

At 518, process 500 calls a REST API of cloud-based master knowledge graph database 520 to insert new nodes and edges into a master security risk knowledge graph from the Gremlin scripts processing the different types of security information. The REST API defines a set of constraints and properties based on Hypertext Transfer Protocol. Services that conform to REST provide interoperability between computers on a network (e.g., local knowledge graph database servers and a master knowledge graph database server, such as local knowledge graph database servers 104 and 106 and master knowledge graph database server 108 connected via network 102 in FIG. 1).

Figure 6:
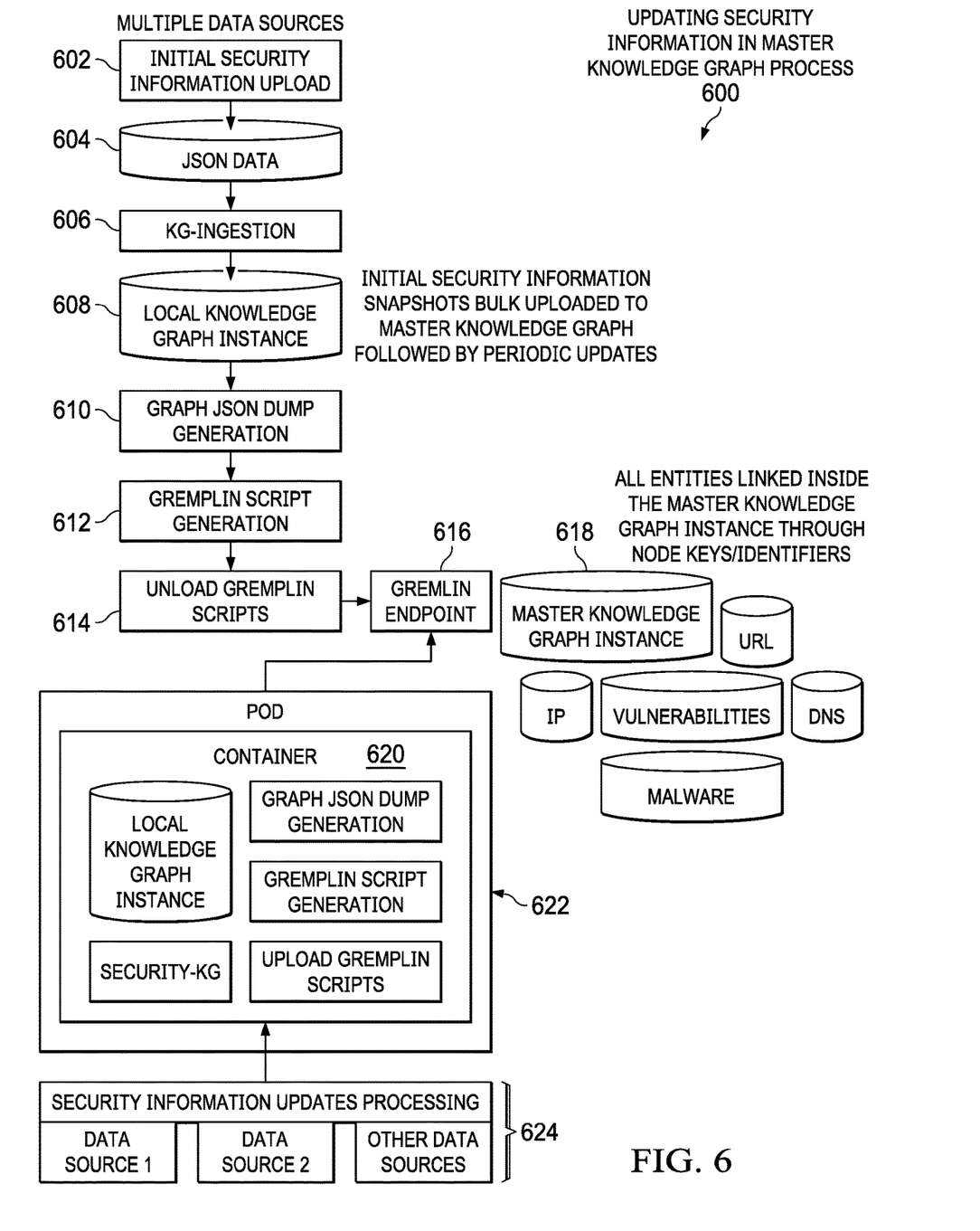
FIG. 6 is a diagram illustrating update of security information in a master knowledge graph instance in accordance with an illustrative embodiment.

With reference now to FIG. 6, a diagram illustrating update of security information in a master knowledge graph instance is depicted in accordance with an illustrative embodiment. Updating security information in master knowledge graph process 600 may be implemented in a network of data processing systems, such as network data processing system 100 in FIG. 1, or a cloud computing environment, such as cloud computing environment 300 in FIG. 3.

Similar to initial ingestion of security information into master knowledge graph process 500 in FIG. 5, updating security information in master knowledge graph process 600 at 602 performs an initial security information upload into a local knowledge graph database. At 604, process 600 generates a JSON security risk data file based on the uploaded security information in the local knowledge graph database. At 606, process 600 ingests the generated JSON security risk data file and generates a local security risk knowledge subgraph instance in the local knowledge graph database using the JSON security risk data file at 608.

Further, process 600 generates a graph JSON dump based on the local security risk knowledge subgraph instance at 610. Then, process 600 generates a custom Gremlin script corresponding to the uploaded security information using the graph JSON dump at 612. Process 600 uploads the custom Gremlin script into Gremlin endpoint 616, which calls a REST API of master knowledge graph instance 618 to insert new nodes and edges corresponding to security information into master knowledge graph instance 618. Master knowledge graph instance 618 links entities through node keys, for example, or through other types of identifiers. Furthermore, process 600 utilizes container 620 of pod 622 to process security information updates 624. Container 620 sends the processed security information updates to gremlin endpoint 616.

Figure 7:
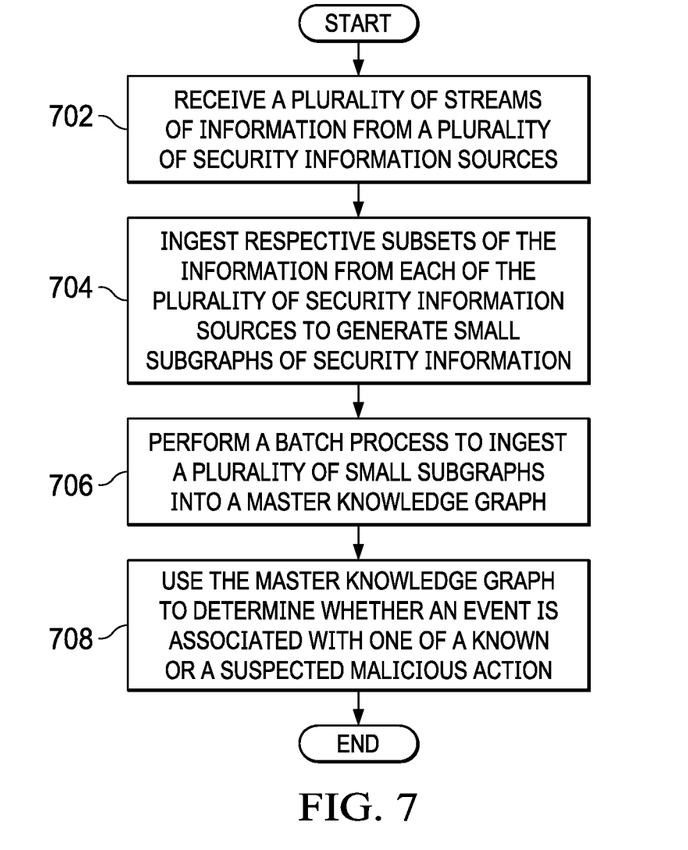
FIG. 7 is a flowchart illustrating a process for ingesting security information in accordance with an illustrative embodiment.

With reference now to FIG. 7, a flowchart illustrating a process for ingesting security information is shown in accordance with an illustrative embodiment. The process shown in FIG. 7 may be implemented in a network of data processing systems, such as network data processing system 100 in FIG. 1, or a cloud computing environment, such as cloud computing environment 300 in FIG. 3.

The process begins when local knowledge graph database servers receive a plurality of streams of information from a plurality of security information sources (step 702). The local knowledge graph database servers may be, for example, local knowledge graph database servers 104 and 106 in FIG. 1. Each of the local knowledge graph database servers ingest respective subsets of the information from each of the plurality of security information sources to generate small knowledge subgraphs of security information (step 704). Each of the small knowledge subgraphs complies with a schema used by a master knowledge graph. As a result, any errors will be known during local knowledge subgraph upload.

A master knowledge graph database server performs a batch process to ingest a plurality of small knowledge subgraphs from the local knowledge graph database servers into the master knowledge graph (step 706). The master knowledge graph database server may be, for example, master knowledge graph database server 108 in FIG. 1. The master knowledge graph database server uses the master knowledge graph to determine whether an event is associated with one of a known malicious action or a suspected malicious action during security incident analysis (step 708). Thereafter, the process terminates.

Figure 8A:
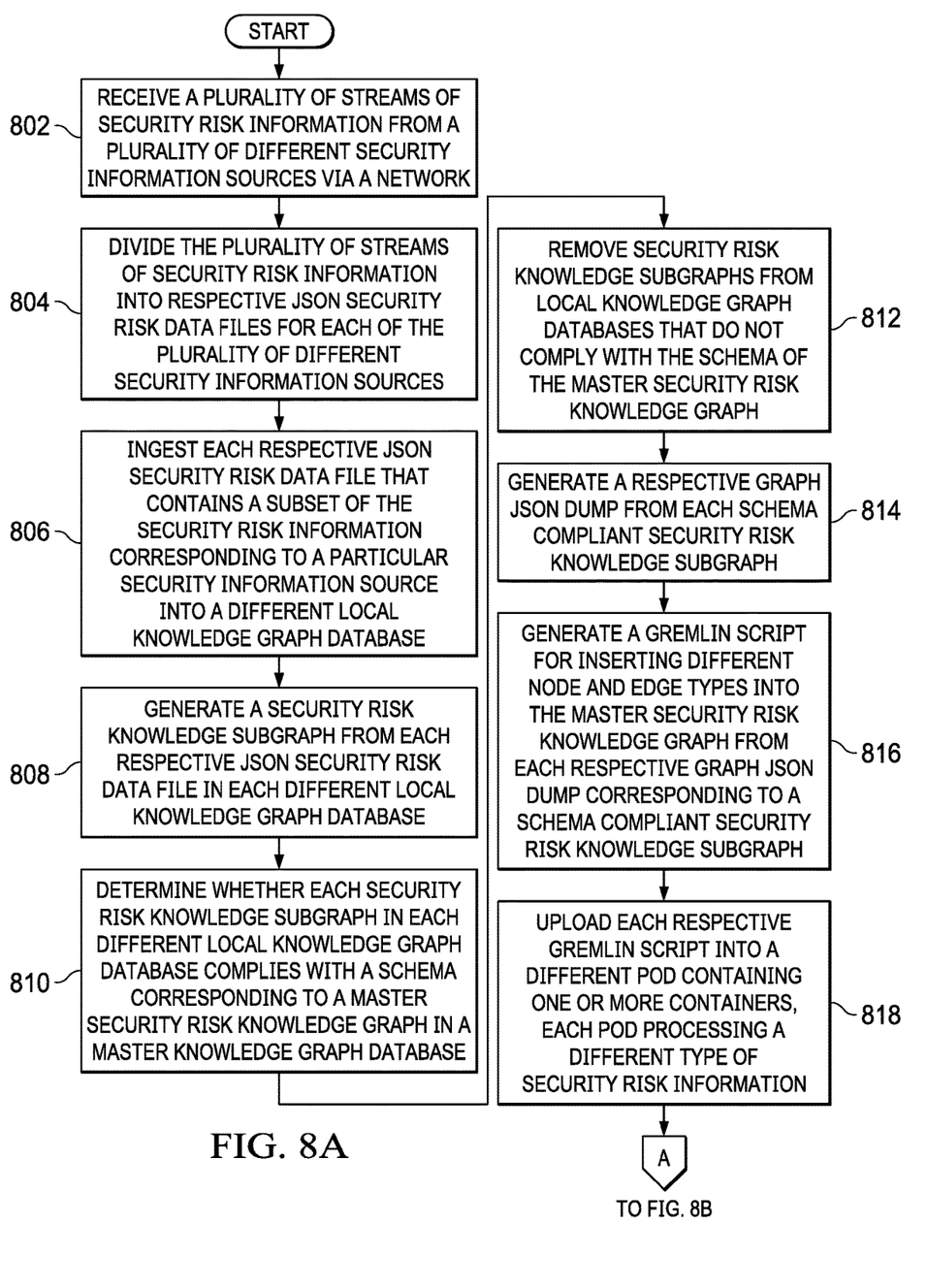
FIGS. 8A-8B are a flowchart illustrating a process for optimizing ingestion of structured security information into a cloud-based master knowledge graph database for data security analytics in accordance with an illustrative embodiment.
Figure 8B:
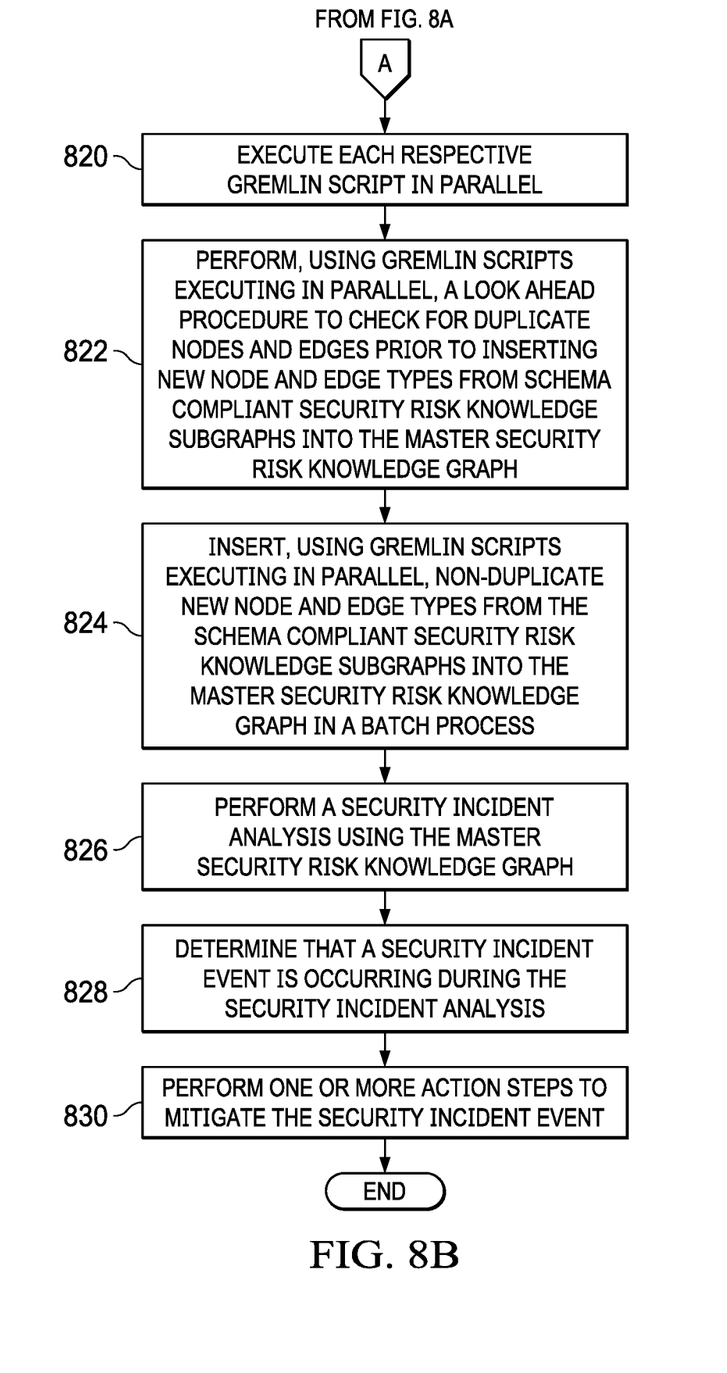

With reference now to FIGS. 8A-8B, a flowchart illustrating a process for optimizing ingestion of structured security information into a cloud-based master knowledge graph database for data security analytics is shown in accordance with an illustrative embodiment. The process shown in FIGS. 8A-8B may be implemented in a network of data processing systems, such as network data processing system 100 in FIG. 1, or a cloud computing environment, such as cloud computing environment 300 in FIG. 3

The process begins when a set of two or more processors receives a plurality of streams of security risk information from a plurality of different security information sources via a network (step 802). The set of processors divides the plurality of streams of security risk information into respective JSON security risk data files for each of the plurality of different security information sources (step 804). The set of processors ingests each respective JSON security risk data file, which contains a subset of the security risk information corresponding to a particular security information source, into a different local knowledge graph database (step 806).

Afterward, the set of processors generates a security risk knowledge subgraph from each respective JSON security risk data file in each different local knowledge graph database (step 808). In addition, the set of processors determine whether each security risk knowledge subgraph in each different local knowledge graph database complies with a schema corresponding to a master security risk knowledge graph in a master knowledge graph database (step 810). The set of processors removes security risk knowledge subgraphs from local knowledge graph databases that do not comply with the schema of the master security risk knowledge graph (step 812). Alternatively, the set of processors may resolve any errors associated with non-complying local knowledge subgraphs so that they are compliant with the schema of the master security risk knowledge graph.

The set of processors generates a respective graph JSON dump from each schema compliant security risk knowledge subgraph (step 814). Further, the set of processors generates a Gremlin script for inserting different node and edge types into the master security risk information graph from each respective graph JSON dump corresponding to a schema compliant security risk knowledge subgraph (step 816). The set of processors uploads each respective Gremlin script into a different pod containing one or more containers, each pod processing a different type of security risk information (step 818).

The set of processors executes each respective Gremlin script in parallel (step 820). The set of processors, using Gremlin scripts executing in parallel, also perform a look ahead procedure to check for duplicate nodes and edges prior to inserting new node and edge types from schema compliant security risk knowledge subgraphs into the master security risk knowledge graph (step 822). Furthermore, the set of processors, using Gremlin scripts executing in parallel, inserts non-duplicate new node and edge types from the schema compliant security risk knowledge subgraphs into the master security risk knowledge graph in a batch process (step 824).

Moreover, the set of processors performs a security incident analysis using the master security risk knowledge graph (step 826). The set of processors determines that a security incident event is occurring during the security incident analysis (step 828). The set of processors then performs one or more action steps to mitigate the security incident event (step 830). Thereafter, the process terminates.

Thus, illustrative embodiments of the present invention provide a method, data processing system, and computer program product for optimizing ingestion of structured security information into a cloud-based master knowledge graph database for data security analytics. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing ingestion of security structured data into a graph database for security analytics, the method comprising:
   receiving a plurality of streams of information from a plurality of security information sources;
   ingesting respective subsets of information from each of the plurality of security information sources to generate small subgraphs of security information, wherein each of the small subgraphs is generated in a local knowledge graph database to comply to a schema used by a master knowledge graph, wherein the security information is uniquely marked with a unique key so that entities associated with the security information are identified similarly in both local and master knowledge graph databases; and
   performing a batch process to ingest a plurality of small subgraphs into the master knowledge graph.

2. The method of claim 1 further comprising:
   using the master knowledge graph to determine whether a security incident event is associated with a known or suspected malicious action during security incident analysis.

3. The method of claim 2 further comprising:
   performing a set of action steps to mitigate the known or suspected malicious action.

4. The method of claim 1 further comprising:
   dividing the plurality of streams of information into respective JavaScript Object Notation (JSON) security risk data files for each of the plurality of security information sources.

5. The method of claim 4 further comprising:
   generating a plurality of security risk knowledge subgraphs in a plurality of different local knowledge graph databases, each particular security risk knowledge subgraph is generated from a corresponding JSON security risk data file.

6. The method of claim 1 further comprising:
   performing a look ahead procedure prior to inserting a new node or edge into the master knowledge graph as part of bulk upload.

7. The method of claim 1, wherein the batch process is performed in parallel by a plurality of tailored script instances, each tailored script instance for ingesting a specific type of security information.

8. The method of claim 7, wherein the plurality of tailored script instances is a plurality of custom scripts.

9. The method of claim 8, wherein each of the plurality of custom scripts is generated from a respective graph JavaScript Object Notation dump corresponding to a particular local security risk knowledge subgraph.

10. The method of claim 1, wherein the plurality of security information sources is selected from a group of threat portals including Internet Protocol address reputation, malware hashes, Uniform Resource Locator reputation, vulnerability information, and Domain Name System records.

11. A data processing system for optimizing ingestion of security structured data into a graph database for security analytics, the data processing system comprising:
a bus system;
a storage device connected to the bus system, wherein the storage device stores program instructions; and
a set of processors connected to the bus system, wherein the set of processors executes the program instructions to:
receive a plurality of streams of information from a plurality of security information sources;
ingest respective subsets of information from each of the plurality of security information sources to generate small subgraphs of security information, wherein each of the small subgraphs is generated in a local knowledge graph database to comply to a schema used by a master knowledge graph, wherein the security information is uniquely marked with a unique key so that entities associated with the security information are identified similarly in both local and master knowledge graph databases; and
perform a batch process to ingest a plurality of small subgraphs into the master knowledge graph.

12. The data processing system of claim 11, wherein the set of processors further executes the program instructions to:
use the master knowledge graph to determine whether a security incident event is associated with a known or suspected malicious action during security incident analysis.

13. The data processing system of claim 12, wherein the set of processors further executes the program instructions to:
perform a set of action steps to mitigate the known or suspected malicious action.

14. The data processing system of claim 11, wherein the set of processors further executes the program instructions to:
divide the plurality of streams of information into respective JavaScript Object Notation (JSON) security risk data files for each of the plurality of security information sources.

15. The data processing system of claim 14, wherein the set of processors further executes the program instructions to:
generate a plurality of security risk knowledge subgraphs in a plurality of different local knowledge graph databases, each particular security risk knowledge subgraph is generated from a corresponding JSON security risk data file.

16. The data processing system of claim 11, wherein the program instructions further comprise program instructions to perform the batch process in parallel by a plurality of tailored script instances, each tailored script instance for ingesting a specific type of security information.

17. The data processing system of claim 16, wherein the plurality of tailored script instances is a plurality of custom scripts.

18. A computer program product for optimizing ingestion of security structured data into a graph database for security analytics, the computer program product comprising a computer readable storage medium having program instructions embodied therewith, the program instructions executable by a set of processors to cause the set of processors to perform a method comprising:
receiving a plurality of streams of information from a plurality of security information sources;
ingesting respective subsets of information from each of the plurality of security information sources to generate small subgraphs of security information, wherein each of the small subgraphs is generated in a local knowledge graph database to comply to a schema used by a master knowledge graph, wherein the security information is uniquely marked with a unique key so that entities associated with the security information are identified similarly in both local and master knowledge graph databases; and
performing a batch process to ingest a plurality of small subgraphs into the master knowledge graph.

19. The computer program product of claim 18 further comprising:
using the master knowledge graph to determine whether a security incident event is associated with a known or suspected malicious action during security incident analysis.

20. The computer program product of claim 19 further comprising:
performing a set of action steps to mitigate the known or suspected malicious action.

21. The computer program product of claim 18 further comprising:
dividing the plurality of streams of information into respective JavaScript Object Notation (JSON) security risk data files for each of the plurality of security information sources.

22. The computer program product of claim 21 further comprising:
generating a plurality of security risk knowledge subgraphs in a plurality of different local knowledge graph databases, each particular security risk knowledge subgraph is generated from a corresponding JSON security risk data file.

23. The computer program product of claim 18, wherein the batch process is performed in parallel by a plurality of tailored script instances, each tailored script instance for ingesting a specific type of security information.

24. The computer program product of claim 23, wherein the plurality of tailored script instances is a plurality of custom scripts.

25. A method for optimizing ingestion of security structured data into a graph database for security analytics, the method comprising:
receiving a plurality of streams of information from a plurality of security information sources;
ingesting respective subsets of information from each of the plurality of security information sources to generate small subgraphs of security information, wherein each of the small subgraphs comply to a schema used by a master knowledge graph; and
performing a batch process to ingest a plurality of small subgraphs into the master knowledge graph,
wherein the batch process is performed in parallel by a plurality of tailored script instances, each tailored script instance for ingesting a specific type of security information.

* * * * *